May 13, 1924.
J. J. ENGLERT
CUTTING AND PUNCHING MACHINE
1,493,974
Original Filed Oct. 26, 1920   2 Sheets-Sheet 1
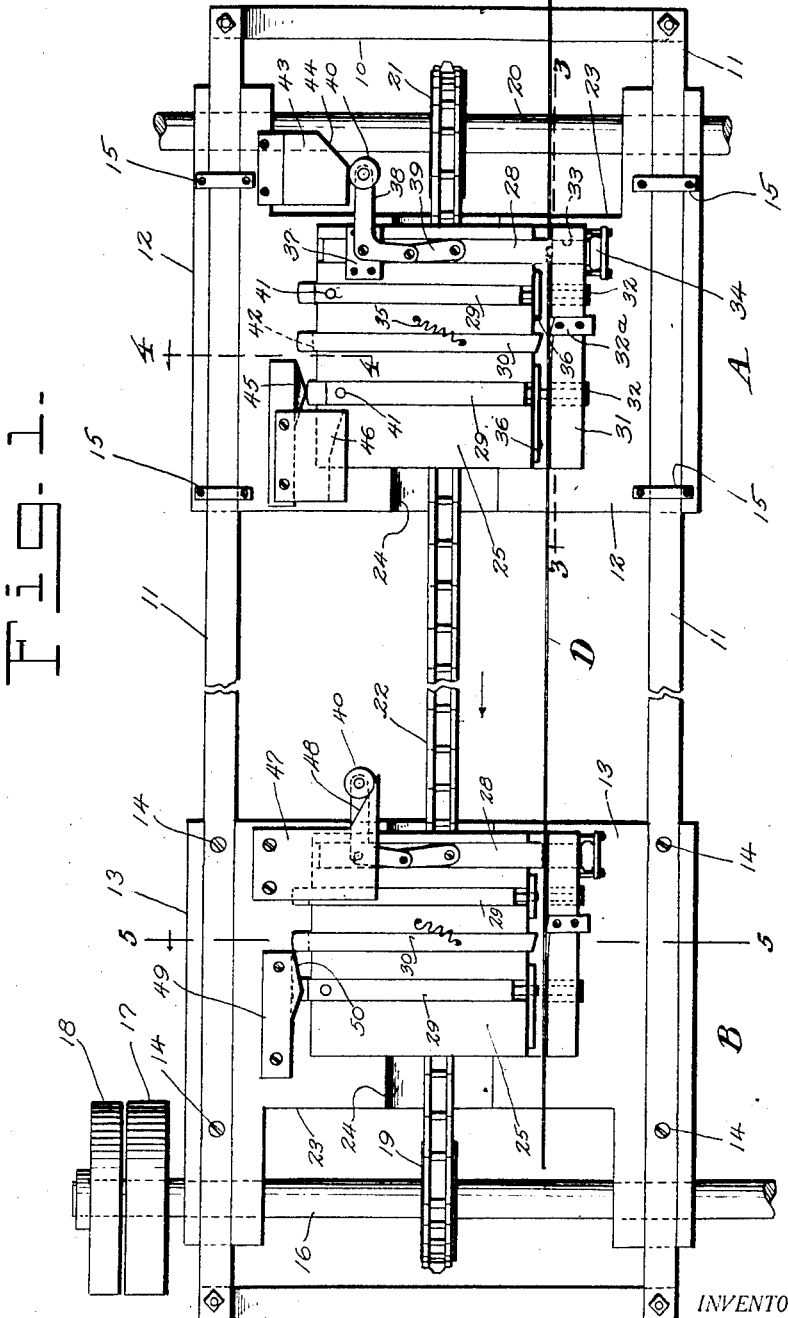
INVENTOR.
Joseph J. Englert.
BY
ATTORNEYS.

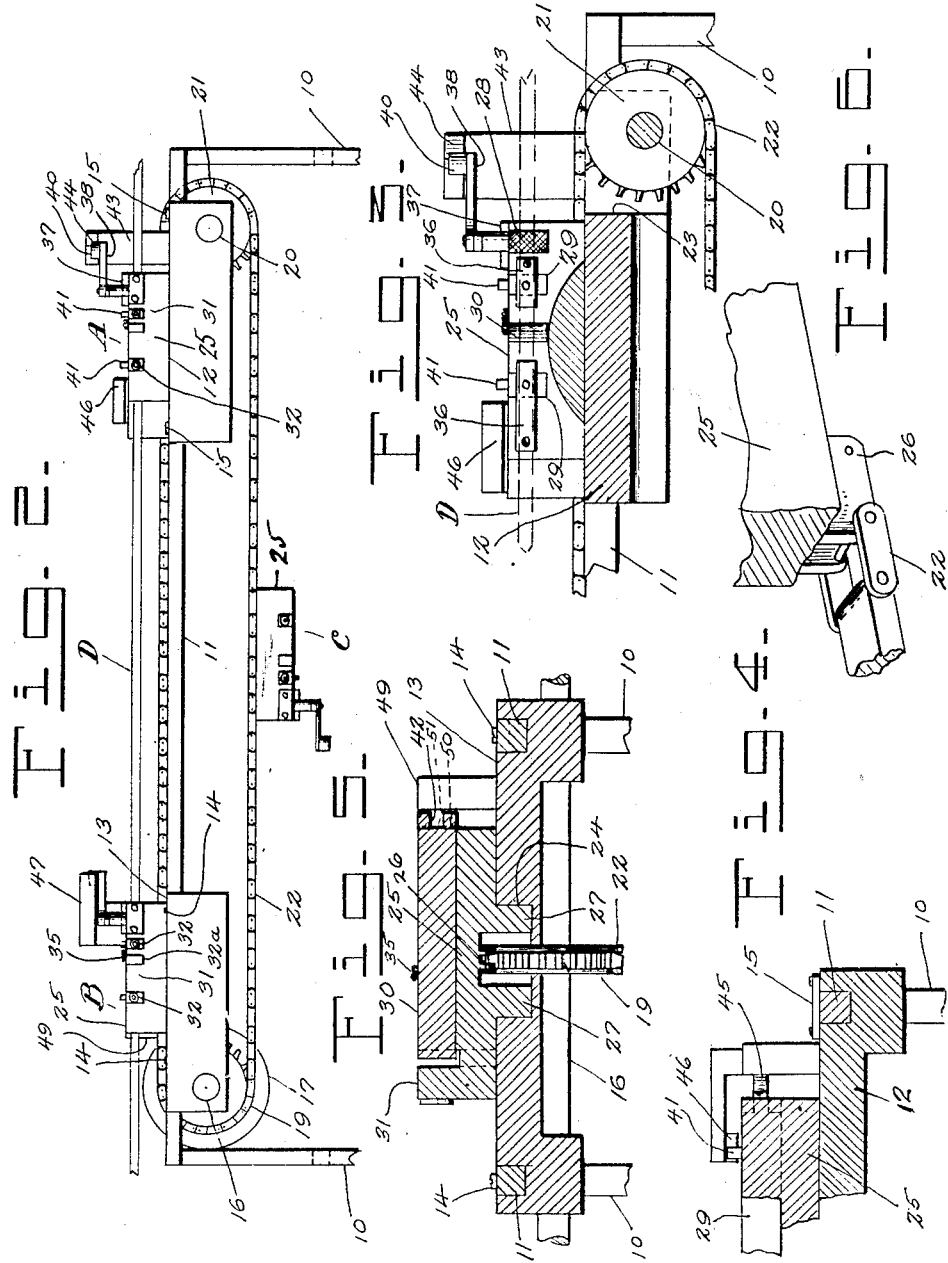
May 13, 1924.
J. J. ENGLERT
CUTTING AND PUNCHING MACHINE
Original Filed Oct. 26, 1920   2 Sheets-Sheet 2
1,493,974
INVENTOR:
Joseph J. Englert.
BY
ATTORNEYS.

Patented May 13, 1924.

1,493,974

UNITED STATES PATENT OFFICE.

JOSEPH J. ENGLERT, OF CHICAGO, ILLINOIS.

CUTTING AND PUNCHING MACHINE.

Application filed October 26, 1920, Serial No. 419,648. Renewed September 29, 1923.

*To all whom it may concern:*

Be it known that I, JOSEPH J. ENGLERT, a citizen of the United States, residing at Chicago, in the county of Cook and State of Illinois, have invented new and useful Improvements in Cutting and Punching Machines, of which the following is a specification.

The machine which is the subject matter of the present application for patent has been designed for cutting wire, bands and similar material into pieces of certain predetermined lengths, and also for punching the material if the same consists of flat stock such as is used for box strapping, barrel hoops, or the like.

The invention has for its object to provide a simple and efficient machine of the kind stated, and also one which can be readily adjusted for cutting the stock into different lengths, and in which the adjustment for adapting the machine for a cutting and a punching operation, or for a cutting operation alone, is easily made.

The object stated is attained by means of a novel combination and arrangement of parts to be hereinafter described and claimed, and in order that the same may be better understood, reference is had to the accompanying drawings forming a part of this specification.

In the drawings,

Figure 1 is a plan view of the machine, partly broken away; Fig. 2 is a side elevation of the machine; Fig. 3 is a longitudinal section on the line 3—3 of Fig. 1; Figs. 4 and 5 are cross-sections on the lines 4—4 and 5—5 respectively of Fig. 1, and Fig. 6 is a detail in perspective.

Referring specifically to the drawings, the supporting frame of the machine consists of end members 10 and laterally spaced, horizontal side rails 11 bolted or otherwise rigidly secured thereto, said end members being the legs of the frame. The side rails 11, near one end of the frame support a top piece or table 12. and near the opposite end a top piece or table 13. The table 13 is fastened to the side rails 11 by screws 14, and the table 12 is adjustably fastened to said side rails so that it may be adjusted toward or from the table 13. this fastening being made by straps 15. The two tables are longitudinally grooved to seat the side rails.

The table 13 supports a transversely extending shaft 16 having tight and loose pulleys 17 and 18 at one end for a drive belt, which latter when it is shifted onto the tight pulley, transmits motion to the shaft 16. Intermediate its ends, the shaft 16 carries a sprocket wheel 19.

The table 12 supports a shaft 20 provided with a sprocket wheel 21.

The sprocket wheels 19 and 21 are in alinement, and they are connected by a chain 22, which latter is set in motion by the shaft 16. As shown in Fig. 1, the chain 22 runs lengthwise of the tables 12 and 13, and the latter have end recesses 23 to clear the sprocket wheels 19 and 21.

The chain 22 is so positioned that its upper run travels above the tables 12 and 13, and its lower run beneath the same, the tables having longitudinal top grooves 24 in which the chain runs.

Fastened to the chain 22 to travel therewith when the same is in motion, are tool-supporting carriages on which are mounted the material or work gripping, cutting and punching devices. Referring to Fig. 2, it will be noted that the machine is equipped with three carriages denoted by the reference characters A, B and C, respectively. The work gripping, cutting and punching devices on the several carriages are alike, and hence a description of one carriage and its associate devices suffices for all. The number of carriages employed may be varied according to the lengths into which the material is to be cut as will be presently described.

Each carriage hereinbefore referred to is a block 25 having bottom ears 26 by which it is connected to the chain 22 as shown in Fig. 6. The bottom of the block 25 also has depending guide ribs 27 to enter the grooves 24 as the block slides across the tables 12 and 13, the ears 26 being located between the ribs 27.

The block 25 carries a work gripping jaw 28. two punches 29, and a cutter 30 located between the punches, these being all mounted so as to slide in parallelism transversely of the line of travel of the block and the work or material to be operated on. The block 25 has top grooves in which the gripping, punching and cutting members slidably seat, and opposite the working ends of said members, the block has an upstanding portion 31 carrying dies 32 for the punches 29, a stationary cutter blade 32ª for the cutter 30, and a jaw member 33 cooperating with the jaw 28 to grip the material to be operated on. The jaw 33 is slidably mounted in an opening in the wall 31 and it is backed by a cushion 34 so that it is free to yield slightly to the pressure of the jaw 28. The cutter 30 is held retracted by a spring 35, and the punches 29 are provided with stripper plates 36.

On a retaining plate 37 fastened down on the block 25 over the groove in which the slidable gripping jaw 28 seats, is fulcrumed an angle lever 38 having one of its arms connected by a link 39 to said jaw, and having its other arm fitted with a roller 40.

On the rear ends of the punching members 29 are upstanding pins or abutments 41. The rear end of the cutter 30 is forked as shown at 42.

On the table 12 is mounted a block 43 having an oblique cam-like edge 44 so arranged that when the roller 40 comes in contact therewith, the member 28, through the lever 38 and the link 39, is slid forward to grip the material to be operated on. The table 12 also carries a cam 45 for advancing the punches 29, and a cam 46 for retracting the same. These cams are blocks having inclined surfaces, the surface of the cam 45 being engageable by the rear ends of the punches to advance the same, and the surface of the cam 46 being arranged to intercept the pins 41 and to retract the punches as the pins slide along said cam surface. On the table 13 is a block 47 having a cam surface 48 which intercepts the roller 40 and swings the lever 38 in a direction to retract the gripper 28 to release the material.

The table 13 also carries a block 49 having a cam surface 50 intercepting the cutter 30 and operating to give the same its working stroke. The cam portion 50 is grooved, as shown at 51, so that the rear ends of the punches 29 may pass the same without being actuated. The forked rear end 42 of the cutter 30 engages the cam surface 50, and this end passes the cam member 45 without coming in contact therewith as it straddles the same upon passing it. The parts having the cam surfaces 44, 46 and 48 are elevated above the table 12 and 13 a sufficient distance to allow the free passage of the devices which are not to be actuated by said surfaces. Thus, the punches 29 and the cutter 30 pass the block 43 without coming in contact therewith; the cutter 30 clears the cam 46 and its forked end 42 enables it to clear the cam 45; the punches 29 and the cutter 30 clear the block 47; and the punches 29 clear the cam 50 by entering the groove 51 upon passing the block 49. The lever 38 and roller 40 are positioned so that they are not intercepted by any of the cam members except the members 44 and 48.

The operation of the machine may be summarized as follows:

Assuming that it is desired to cut up the material into lengths of three and one-third feet, a chain 22 ten feet in length, and equipped with the three units A, B and C, spaced apart equal distances, will be employed. At the commencement of the operation, the end of the work or material D is placed so that it is grasped by the gripper 28 on the unit A. The chain 22 being in motion, and its upper run traveling to the left as indicated by the arrow in Fig. 1, the unit A is carried along in that direction by the chain, and the material is also drawn along. When the unit A reaches the position initially occupied by the unit B, the cutter 30 is operated to sever the material, and the gripper 28 releases the severed portion, the cut being made in advance of that portion of the material which is held by the gripper. In the mean time the unit C has arrived at the initial position of unit A, and the material is again grasped by the gripper 28 of unit C, and as it advances the punches 29 are operated. The unit C continues to travel forwardly and when it reaches the position initially occupied by unit B, the material is severed by the cutter 30 of unit C, at which time the unit B has reached the position initially occupied by unit A, and the material is now again gripped and punched. These operations are repeated until the job is completed. If the material to be operated on is wire, and it is to be severed only, the punches 29 will be removed, leaving only the gripper 28 and the cutter 30 to operate. As each unit operates in succession, the machine is very rapid in operation.

The machine is very compact, its length with a ten-foot chain 22 being only about four feet. With a chain of this length it is also possible to cut ten-feet lengths, this being done by removing the cutters from all but one of the units A, B and C, so that two units grip and carry the material forwardly, and the third unit does the cutting. The chain 22 can also be shortened by removal of some of its links, and the number of units employed can be varied, and the spacing thereof adjusted according to the lengths to be cut, it being understood that the table 12 will be correspondingly adjusted toward or from the table 13.

It will be noted in Fig. 1 that the link 39 and the arm of the lever 38 to which said link is connected have a toggle action and when the gripper 28 has been advanced to grasp the material, the two toggle arms are out of alinement, whereby the gripper is locked in advanced position.

I claim:

1. A machine of the character described comprising an endless traveling carrier, a pair of longitudinally spaced tables across which one of the runs of the carrier travels, a plurality of tool-supporting members connected to the carrier to travel therewith and spaced in the direction of the length thereof, each of said members carrying a cutter and a work-engaging gripper, means on one of the tables for operating the gripper to engage the work, means on the other table for actuating the cutter, means on the last-mentioned table for retracting the gripper to release the work, and means for driving the aforesaid carrier in a direction to carry the tool-supporting members past the tables successively in the order stated.

2. A machine of the character described comprising an endless traveling carrier, a plurality of tool-supporting members connected to the carrier to travel therewith, and spaced in the direction of the length thereof, each of said members carrying a tool and a work-engaging gripper, means for operating the gripper to engage the work, means for actuating the tool, and means for retracting the gripper, said means operating successively in the order stated.

3. A machine of the character described comprising an endless traveling carrier, a plurality of tool-supporting members connected to the carrier to travel therewith, and spaced in the direction of the length thereof, each of said members carrying a tool and a work-engaging gripper, means for operating the gripper to engage the work, means for actuating the tool, and means for retracting the gripper, said tool-actuating and gripper-retracting means operating ahead of the gripper engaging means.

4. A machine of the character described comprising an endless traveling carrier, a plurality of tool-supporting members connected to the carrier to travel therewith, and spaced in the direction of the length thereof, each of said members carrying a tool and a work-engaging gripper, means for operating the gripper to engage the work, means for actuating the tool, and means for retracting the gripper, said tool-actuating and gripper-retracting means operating on the work at a point ahead of its engagement by the gripper.

5. A machine of the character described comprising a plurality of spaced work-gripping means and work-engaging tools associated therewith, means for propelling the gripping means to feed the work in the direction of its length, actuating means for the gripping means, and actuating means for the tools, the tool-actuating means operating to engage the tool with the work at a point ahead of its engagement by the gripping means.

6. A machine of the character described comprising an endless traveling carrier, a pair of longitudinally spaced tables across which one of the runs of the carrier travels, one of the tables being adjustable toward and from the other table to vary the spacing between said tables, a plurality of tool-supporting members connected to the carrier to travel therewith and spaced in the direction of the length thereof, each of said members carrying a tool and a work-engaging gripper, means on one of the tables for operating the gripper to engage the work, means on the other table for actuating the tool, means on the last-mentioned table for retracting the gripper to release the work, and means for driving the aforesaid carrier in a direction to carry the tool-supporting members past the tables successively in the order stated.

7. A machine of the character described comprising an endless traveling carrier, a pair of longitudinally spaced tables across which one of the runs of the carrier travels, one of the tables being adjustable toward and from the other table to vary the spacing between said tables, a plurality of tool-supporting members connected to the carrier to travel therewith and spaced in the direction of the length thereof, each of said members carrying a cutter and a work-engaging gripper, means on one of the tables for operating the gripper to engage the work, means on the other table for actuating the cutter, means on the last-mentioned table for retracting the gripper to release the work, and means for driving the aforesaid carrier in a direction to carry the tool-supporting members past the tables successively in the order stated.

8. A machine of the character described comprising a plurality of spaced work-gripping means, carriers for said means, means for propelling the carriers to feed the work in the direction of its length, work-engaging cutters and punches on the carriers, actuating means for the grippers, actuating means for the cutters, and actuating means for the punches, the cutter-actuating means operating to engage the cutter with the work at a point ahead of its engagement by the gripping means and the punches.

9. A machine of the character described comprising a plurality of spaced work-gripping means, carriers for said means, means for propelling the carriers to feed the work in the direction of its length, work-engaging cutters and punches on the carriers, actuating means for the grippers, actuating means for the cutters, and actuating means for the punches, the cutter-actuating means operating to engage the cutter of one of the carriers with the work at a point ahead of its engagement by the gripping means and the punches of another carrier.

10. A machine of the character described comprising a plurality of spaced work-gripping means and work-engaging tools associated therewith, means for propelling the gripping means to feed the work in the direction of its length, actuating means for the gripping means, actuating means for the tools, the tool-actuating means operating to engage the tool with the work at a point ahead of its engagement by the gripping means, and means for disengaging the gripping means from the work at the site of its engagement by the tool.

11. A machine of the character described comprising a plurality of spaced work-gripping means, carriers for said means, means for propelling the carriers to feed the work in the direction of its length, work-engaging tools on the carriers, actuating means for the gripping means, actuating means for the tools, the tool-actuating means operating to engage the tool with the work at a point ahead of its engagement by the gripping means, and means for disengaging the gripping means from the work at the site of its engagement by the tool.

12. A machine of the character described comprising a plurality of spaced work-gripping means, carriers for said means, means for propelling the carriers to feed the work in the direction of its length, work-engaging tools on the carriers, actuating means for the gripping means, actuating means for the tools, the tool-actuating means operating to engage the tool of one of the carriers with the work at a point ahead of its engagement by the gripping means of another carrier, and means for disengaging the gripping means from the work at the site of its engagement by the tool.

13. A machine of the character described comprising a plurality of spaced work-gripping means, carriers for said means, means for propelling the carriers to feed the work in the direction of its length, work-engaging cutters and punches on the carriers, actuating means for the grippers, actuating means for the cutters, actuating means for the punches, the cutter-actuating means operating to engage the cutter with the work at a point ahead of its engagement by the gripping means and the punches, and means for disengaging the gripping means from the work at the site of its engagement by the cutter.

14. A machine of the character described comprising a plurality of spaced work-gripping means, carriers for said means, means for propelling the carriers to feed the work in the direction of its length, work-engaging cutters and punches on the carriers, actuating means for the grippers, actuating means for the cutters, actuating means for the punches, the cutter-actuating means operating to engage the cutter of one of the carriers with the work at a point ahead of its engagement by the gripping means and the punches of another carrier, and means for disengaging the gripping means from the work at the site of its engagement by the cutter.

In testimony whereof I affix my signature.

JOSEPH J. ENGLERT.